United States Patent [19]
Grenzebach

[11] 3,946,997
[45] Mar. 30, 1976

[54] AGITATOR FOR NONHOMOGENEOUS, LIQUID MATERIALS IN A TANK

[76] Inventor: Hans Grenzebach, Am Neuberg 11, 878 Gemunden (Main), Germany

[22] Filed: Nov. 23, 1973

[21] Appl. No.: 418,598

[30] Foreign Application Priority Data
Nov. 25, 1972   Germany............................ 2257956

[52] U.S. Cl. ........... 259/45; 259/DIG. 13; 99/277.2
[51] Int. Cl.² ........................................... B01F 7/08
[58] Field of Search ............... 259/9, 10, 25, 26, 45, 259/46, 109, 110, DIG. 13, DIG. 14; 99/277.2

[56]   References Cited
UNITED STATES PATENTS

| | | | |
|---|---|---|---|
| 2,064,131 | 12/1936 | Tuscan.................................. | 259/10 |
| 2,746,730 | 5/1956 | Swenson................................ | 259/9 |
| 3,469,824 | 9/1969 | Futty et al....................... | 259/178 R |
| 3,524,730 | 8/1970 | Yokouchi........................... | 259/9 X |
| 3,761,059 | 9/1973 | Rothert et al............................ | 259/9 |

Primary Examiner—Daniel Blum
Assistant Examiner—Alan Cantor
Attorney, Agent, or Firm—Woodhams, Blanchard and Flynn

[57]   ABSTRACT

Agitator for nonhomogeneous materials held in a tank. The agitator here in question is particularly intended for use with mixed liquid and solid materials, the solids thereof being of easily damaged nature and wherein the liquid and solid components of the mixture tend to separate. The agitator is thus intended to maintain the materials in a thoroughly mixed condition and to move same lengthwise through a tank to the outlet thereof and yet to do so with minimum physical damage thereto. The agitator of the invention comprises a relatively narrow blade arranged spirally for rotation about an axis positioned in the lower part of a horizontally aligned tank, the blade thereof being either perpendicular or inclinedly positioned with respect to the imaginary cylinder enclosed thereby. If inclined, the outer edge of the blade leads the inner edge as same rotates. The agitator can also be used in vertical alignment if desired and used with or without a central shaft.

7 Claims, 4 Drawing Figures

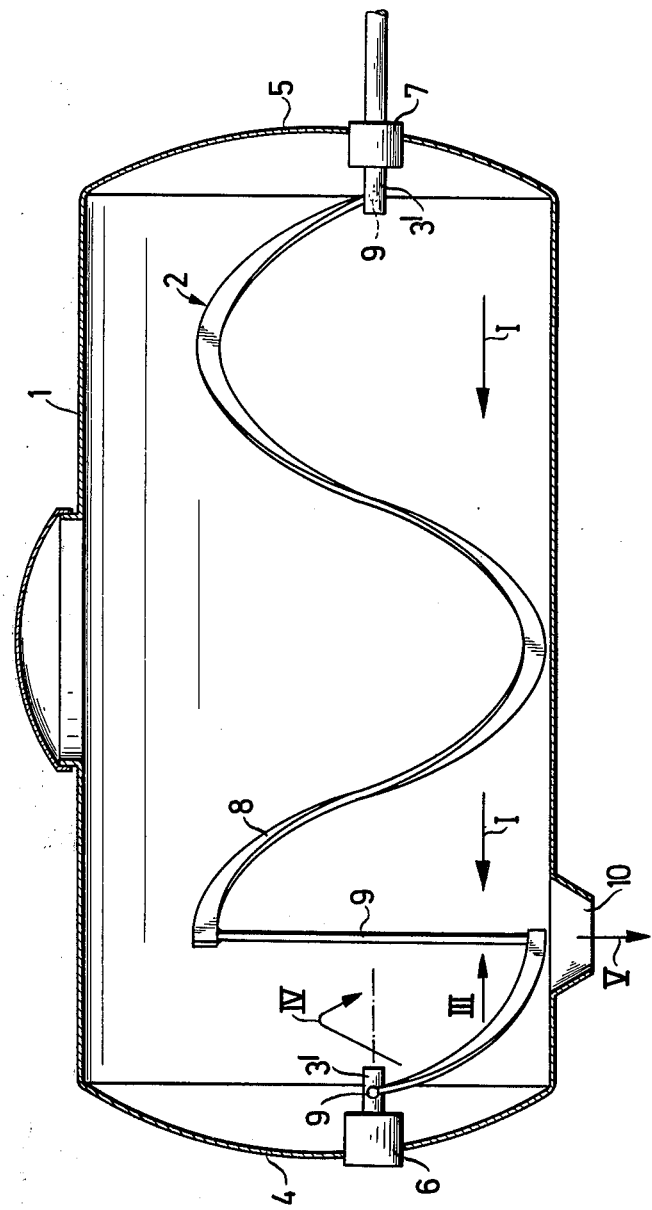

AGITATOR FOR NONHOMOGENEOUS, LIQUID MATERIALS IN A TANK

FIELD OF THE INVENTION

The invention relates to an agitator for nonhomogeneous, liquid materials in a tank, particularly grape mash.

BACKGROUND OF THE INVENTION

Nonhomogeneous goods are often difficult to convey because the liquid substance tends to separate from the solid substance. If one uses a bucket conveyor or a similar device, then the liquid cannot be efficiently conveyed. If one uses a pump, difficulties arise with the solid component. It is nevertheless desirable in the case of liquid, nonhomogeneous, materials in tanks that the liquid and solid components remain mixed (homogenized). Particularly in the case of such material as grape mash, there occurs a separation of the components if the grape mash is stored in a horizontally positioned, cylindrical or approximately cylindrical tank. The must settles on the bottom and the pulp and peels float on top.

If it is desired to empty the grape mash from the tank by means of a pump, the must flows out downwardly and out of the floating, solid parts. Thus, an umpumpable mass of solid material is left. The use of agitators to keep the solid and liquid parts of such goods mixed has already been tried but known agitators work the grape mash too intensively and thereby develop further disadvantages in the wind-pressing step. Furthermore the known agitators consist of an undesirably large number of parts which makes cleaning thereof correspondingly complicated and time-consuming. However, cleaning thereof is required at least once a day. Further, the large number of structural parts increases the price of the known agitators. The large surfaces, corners and edges of the agitator elements which must be moved against the grape mash require in addition a substantial amount of force.

The basic purpose of the invention is to produce an agitator which is constructed simply and therefore inexpensively, which can be cleaned easily and in addition will not damage the goods which are being handled.

The invention attains this purpose by arranging in the tank a rotatable spiral of a small width and at a selected pitch.

Due to the fact that the narrow spiral circulates continuously only small amounts of the material to be agitated, there is achieved a protective treatment of the materials so handled, particularly referring to grape mash. Furthermore only a few arms are necessary for supporting the agitating spiral because the spiral itself comprises a closed structural member. The narrow spiral carries floating thick materials in the upper zone of the tank into the liquid at the bottom. On the other hand, it carries liquid upwardly on the opposite side and mixes it again with the thick materials floating on the top. This assures a constant good mixture (homogenization) of the materials to be agitated, particularly grape mash. Furthermore the agitator results in a very open structure with only a few parts which permits an easy and time-saving cleaning. Finally this agitator is constructed simply, with minimum materials and therefore inexpensively. Through the pitch of the spiral the materials to be agitated are led slowly and without damage to the discharge opening of the tank. This agitator is advantageously arranged near the bottom of the tank.

If the discharge opening is not at the end of the tank and if therefore parts of the spiral are positioned on both sides of the tank discharge opening, then the flights thereof have oppositely extending pitch to convey the material from both ends of the tank to the discharge opening.

The spiral blade can stand perpendicularly to the imaginary cylinder which it encloses. Advantageously, it, however, is positioned at an angle to such imaginary cylinder such that the outer edge of the blade, seen in direction of rotation, leads the inner edge. Due to the angle of pitch of the spiral, the goods, such as grape mash, to be agitated, are carried along still better and are treated more carefully.

Finally, according to a further embodiment of the invention the spiral can be constructed as a self-supporting structural part without a supporting shaft. In this manner, the cleaning of the agitator is made still easier.

BRIEF DESCRIPTION OF THE DRAWINGS

The invention will be discussed more in detail hereinafter in connection with exemplary embodiments which are illustrated in the drawings, in which:

FIG. 4 is a cross-sectional view as in FIG. 1 of a further embodiment.

DETAILED DESCRIPTION

The illustrated agitator is described in connection with a horizontally aligned tank for grape mash. It is understood that the agitator can also be used for other liquid goods of a nonhomogeneous type. It is also possible to install the agitator into an upright container.

Figure 1:
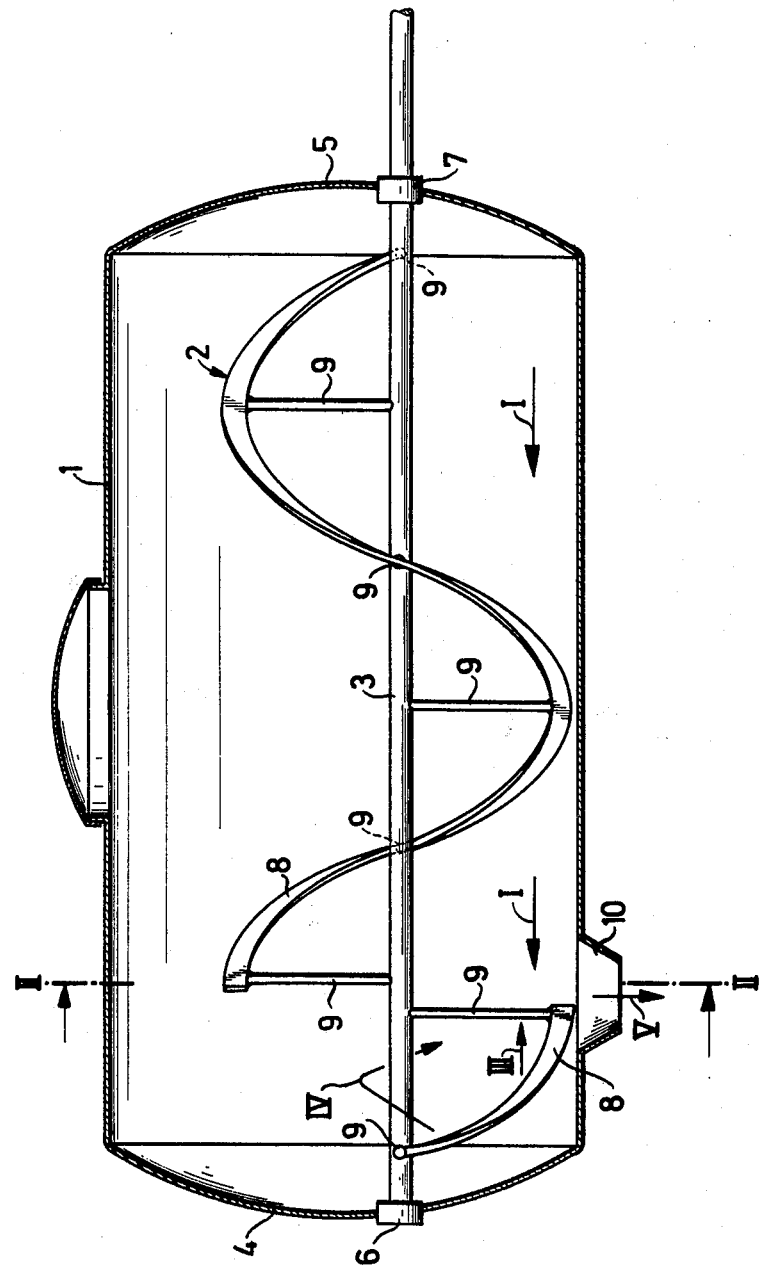
FIG. 1 is a vertical cross-sectional view of a tank having an agitator mounted therein.
Figure 2:
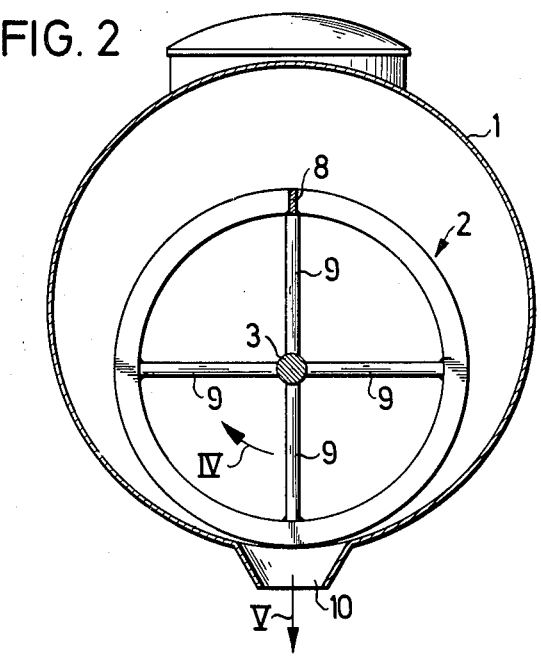
FIG. 2 is a cross-sectional view along the line II—II of FIG. 1.

As can be seen from FIG. 1, an agitator 2 is installed in a common tank 1 of cylindrical shape. A rotatable shaft 3 is for this purpose supported on the oppositely positioned ends 4 and 5 in bearings 6, 7, which shaft 3 extends longitudinally of the tank 1. The shaft 3 is guided outwardly for example at the end 5 and can be driven by any suitable drive (not illustrated). A spiral 8 is provided fixedly connected to the shaft 3 and spaced therefrom. This spiral 8 consists of an upstanding narrow strip of material, preferably of nonrusting metal. This spiral extends longitudinally of the circumference of an imaginary cylinder and is positioned perpendicularly to said imaginary cylinder. The spiral 8 is fixedly connected to the shaft 3 by support arms 9 at several points.

The agitator 2 is arranged in the tank 1 preferably near its bottom.

The pitch of the spiral 8 effects during rotation of the agitator 2 a conveying of the goods, for example grape mash, contained in the tank 1 in the direction of the arrow I toward the discharge opening 10. The grape mash can exit in the direction of the arrow II through the open discharge opening 10. The spiral 8 extends advantageously over the entire, or a substantial portion of, the length of the tank 1. If, as illustrated, the discharge opening 10 is at a distance from one end, for example the end 4, of the tank 1, the spiral 8 can be divided. In such case, the spiral blade 8 which is provided on the other side of the discharge opening 10 is constructed of opposite hand and conveys in the direction of the arrow III.

Figure 3:
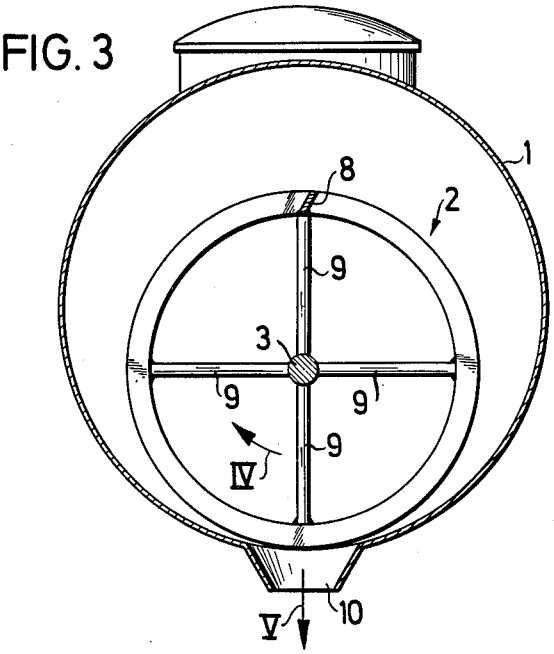
FIG. 3 is a cross-sectional view as in FIG. 2 of a modified embodiment.

In a modified embodiment the spiral 8 is not positioned perpendicularly to the imaginary cylinder which it surrounds, but is inclined thereto in such a manner that, as can be seen from FIG. 3, the outer edge of the spiral 8, when the agitator 2 is driven in the direction of rotation IV, seen in direction of rotation, leads the inner edge thereof. This results in a better conveying and a yet more careful treatment of the goods to be conveyed.

As can be seen from FIG. 4, the shaft 3 can be eliminated and the spiral 8 is then constructed in a self-supporting manner by a suitably dimensioned construction. The spiral ends are fixedly connected to stub shaft 3' which are again supported in bearings 6, 7.

When the agitator 2 is rotated, the narrow spiral 8 on one side takes along the thick substances which float in the upper zone of the tank 1 downwardly into the liquid which stands in the lower zone, on the other side it moves liquid there positioned upwardly and mixes it again with the floating thick substances in the upper zone. Since only relatively small amounts of goods are taken along and the speed of movement is not very high, a nondamaging treatment of the grape mash is assured. Also a complete homogenization (mixing) is assured. As already described, the spiral 8, due to its pitch, also effects conveying the grape mash in the direction of the arrows I or III. The agitator can be cleaned due to its special construction very easily and simply. Furthermore it can be manufactured simply and inexpensively.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. An agitator for a normally nonhomogeneous mixture of must and floating mash, comprising:

an elongated tank means of circular cross section for holding said nonhomogeneous mixture having a central axis;

a single rotatable spiral-shaped blade thin in axial dimension and wide in radial dimension in said tank means, said blade being spaced from the axis of rotation therefor and extending between the opposite ends thereof, the external diameter of said blade being less than the inner diameter of said tank means and the axis of rotation of said blade being offset from and parallel to the central axis of said tank means so that a portion of said blade, in its lowermost position relative to the bottom internal wall surface of said tank, is radially spaced from said bottom internal wall surface a distance which is smaller than the radial width of said blade and, in its uppermost position, is radially spaced from the upper internal wall surface of said tank means a distance which is substantially greater than the radial width of said blade; and means defining an outlet opening in said bottom wall of said tank means, said blade, during rotation, mixing said must and said floating mash so that said mash and said must are nearly homogeneous within a theoretical cylinder defined by said spiral-shaped blade and simultaneously conveying said homogeneous mixture toward said outlet opening.

2. An agitator according to claim 1, wherein said outlet opening is located adjacent one end of said tank means.

3. An agitator according to claim 2, wherein said blade includes a small section less than one pitch length located between said outlet opening and said one end of said tank means and, during said rotation, conveys said homogeneous mixture toward said outlet opening while simultaneously mixing said mixture.

4. An agitator according to claim 1, wherein said wide part of said blade extends normal to the axis of rotation thereof.

5. An agitator according to claim 1, wherein said wide part of said blade extends inclined to the axis of rotation thereof so that the radially outer edge of said blade defines a leading edge during rotation of said blade.

6. An agitator according to claim 1, wherein said blade includes a shaft extending through the center of said spiral and radial arms secured to and extending between said shaft and said blade.

7. An agitator according to claim 1, wherein said blade is self-supporting and is free of a shaft extending through the central part of said spiral.

* * * * *